UNITED STATES PATENT OFFICE.

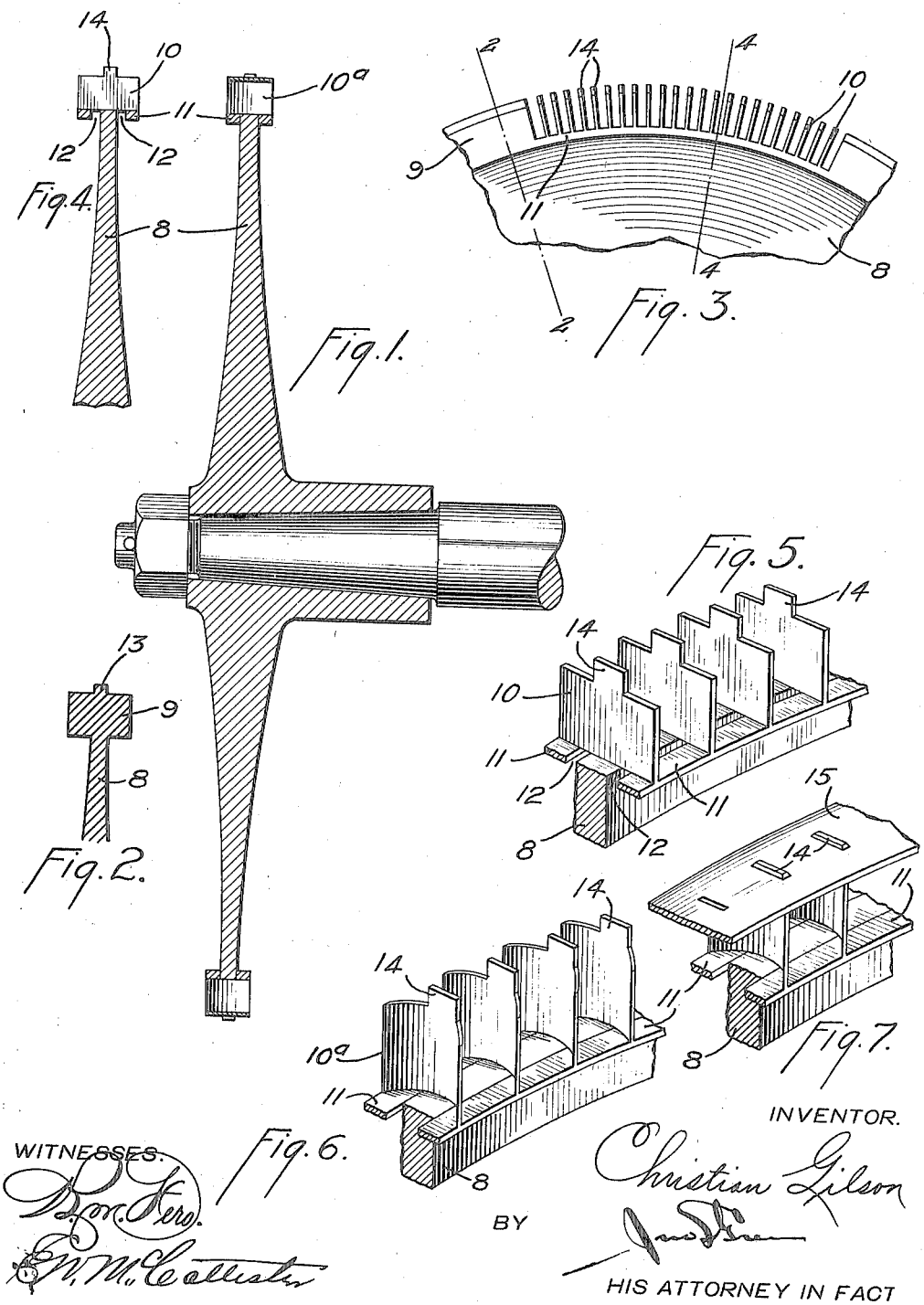

CHRISTIAN GILSON, OF WILKINSBURG, PENNSYLVANIA, ASSIGNOR TO WESTINGHOUSE ELECTRIC & MANUFACTURING COMPANY, A CORPORATION OF PENNSYLVANIA.

BLADE CONSTRUCTION.

1,284,088.

Specification of Letters Patent.

Patented Nov. 5, 1918.

Application filed December 30, 1914. Serial No. 879,753.

*To all whom it may concern:*

Be it known that I, CHRISTIAN GILSON, a citizen of the United States, and a resident of Wilkinsburg, in the county of Allegheny and State of Pennsylvania, have made a new and useful Invention in Blade Construction, of which the following is a specification.

This invention relates to an improved method of making blades or buckets, such for example as those employed in turbines, rotary compressors, pumps, or similar apparatus.

An object of the invention is to simplify the manufacture of the blades or buckets of turbines, compressors or pumps, and at the same time to produce a relatively cheap structure which is strong, durable and rigid.

This and other objects, which will be made apparent throughout the further description of my invention, are attained by means of the method of constructing blades or buckets herein described and illustrated.

In the drawings forming a part hereof, Figure 1 is a sectional view of a turbine rotor equipped with blades embodying my invention and made in accordance with the method herein described and which also forms an embodiment of the invention.

Fig. 2 is a fragmental sectional view of a rotor element along the line 2—2 of Fig. 3 and illustrates one step in the construction of blades in accordance with my invention.

Fig. 3 is a fragmental side elevation of a blade carrying element and illustrates a step in the process of manufacturing blades in accordance with my invention.

Fig. 4 is a fragmental transverse sectional view along the line 4—4 of Fig. 3.

Fig. 5 is a fragmental perspective view of the blade carrying element illustrated in Fig. 3.

Fig. 6 is a fragmental perspective view illustrating the step of my invention succeeding that illustrated in Figs. 3, 4 and 5, and discloses blades or buckets made in accordance with my invention.

Fig. 7 is a fragmental perspective view similar to Fig. 6 and illustrates the blades or buckets equipped with an outer shroud.

My new and improved method of manufacturing blades or buckets may be employed in the manufacture of either rotating or stationary blades or buckets of turbines, compressors or rotary pumps, and it consists in milling or otherwise forming relatively thin, radially extending flat wings on the peripheral face of the blade or bucket carrying member and then in shaping the wings so formed to the contour of a blade or bucket. It will be understood by those skilled in the art, that while I have illustrated and described a method of forming radially extending blades, the method may also be employed in the formation of laterally extending blades, such for example as are employed in the usual form of radial flow turbines.

In carrying out the method in the operation of forming radial blades, the blade carrying element 8 is provided at its periphery with a rim 9, shown in Fig. 2, which is first milled to form radially extending flat wings 10, as shown in Figs. 3, 4 and 5. The rim 9 is so milled that the wings 10 are all of the same width and are equally spaced circumferentially of the blade carrying element. It will also be noted that the transverse cuts made in the rim during the wing-forming operation do not extend radially entirely through the rim, but are of such radial depth that an inner shroud 11 remains at the inner ends of the blades after the milling operation is completed. This shroud member is integral with the blade carrying member 8. The next step in the formation of the wings is the turning of grooves 12 through the shroud 11 or, in other words, the cutting away of portions of the shroud at points immediately adjacent to the blade carrying element 8, as is shown in Figs. 4 and 5. This frees the lateral portions of the wings 10 and thereby makes it possible to shape or form them into blades or buckets having curved fluid receiving and directing faces.

The forming of the blades from the wings 10 is accomplished by moving the remaining portions of the shroud 11 inwardly toward the blade carrying element 8 and, at the same time, slightly shifting both of the shroud portions, in the same direction, circumferentially of the element 8. This moves the radially extending edges of the blades circumferentially, of the element 8, and at the same time toward each other, and, by distorting the wings, produces blades having a substantially uniformly curved fluid receiving and directing face and also produces a continuous shroud for the inner end of the blades, since the shroud portions are moved into contact with the blade carrying element 8. If desired, the blades can then be shaped so that they will more accurately conform to the blade contour necessary for obtaining highest efficiency. Under ordinary circumstances, the blades are sufficiently uniform in shape, and approximate the required contour closely enough, for all practical purposes, after the shroud portions have been pressed against the blade carrying element.

In the drawings I have shown the rim 9 provided with an outer projecting annular ridge or rib 13, which produces shroud engaging tips 14 on the blades 10$^a$. With this arrangement, the outer ends of the blades may be shrouded, as shown in Fig. 7 by inserting the tips 14 through suitable apertures formed in the shroud strip 15 and then riveting over the tips to secure the strip in place.

While I have illustrated and described but one embodiment of my invention, it will be apparent to those skilled in the art that the blades or buckets embodying my invention, and the process or method of making the same may be varied materially without departing from the spirit or scope of my invention, as set forth by the appended claims.

What I claim is:

1. A method of manufacturing blades or buckets, which consists in forming a plurality of wings on the blade carrying element, and then distorting the wings to form blades or buckets.

2. A method of manufacturing blades or buckets, which consists in forming wings on a blade or bucket carrying element and then simultaneously distorting a plurality of said wings to form blades.

3. A method of manufacturing blades or buckets, which consists in forming a plurality of wings having shrouding members integrally formed thereon and spaced from said blade carrying member, and then pressing the shrouding members against the blade carrying member, and thereby shaping the wings to form blades.

4. A method of manufacturing blades or buckets, which consists in forming a blank rim on a blade carrying element, grooving the blank rim to form shrouding members, milling slots in the rim to form wings, and then distorting the wings to form blades or buckets.

5. A method of manufacturing blades or buckets, which consists in forming a blank rim on the periphery of a rotor wheel, grooving the rim to form shrouding members, milling slots in the rim to form flat wings, and shifting the shrouding members circumferentially and transversely in relation to the rotor wheel and simultaneously distorting the wings to form blades or buckets.

6. A method of manufacturing blades, which consists in forming a blank on a blade carrying member, the blank being wider transversely than the blade carrying member, grooving the blank at points adjacent to the member and on each side thereof to form shroud members spaced from the blade carrying member, cutting transversely extending slots through the blank but not entirely through the shroud members to form wings, then shifting the shroud members circumferentially with relation to the blade carrying member and moving them into contact with the blade carrying member and simultaneously distorting the wings to form blades.

In testimony whereof, I have hereunto subscribed my name this 28th day of December, 1914.

CHRISTIAN GILSON.

Witnesses:
  C. W. McGhee,
  E. W. McCallister.